Aug. 10, 1965 C. W. BIRCH 3,199,393
CHAIN CUTTER FOR WEB MATERIALS
Filed June 20, 1963 4 Sheets-Sheet 1
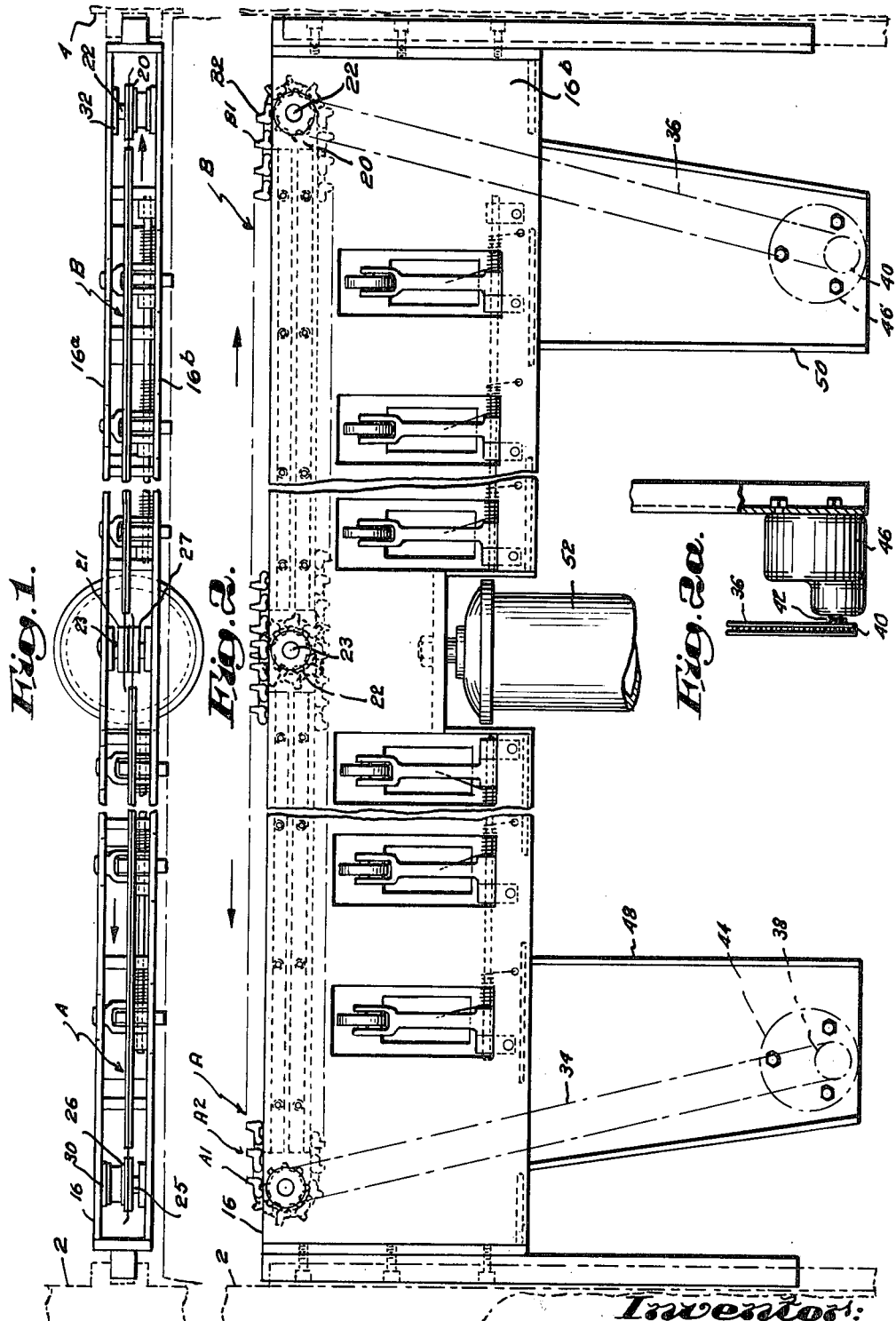

Aug. 10, 1965

C. W. BIRCH 3,199,393

CHAIN CUTTER FOR WEB MATERIALS

Filed June 20, 1963

Inventor:
Clifford W. Birch,
by Munro H. Hamilton
Attorney

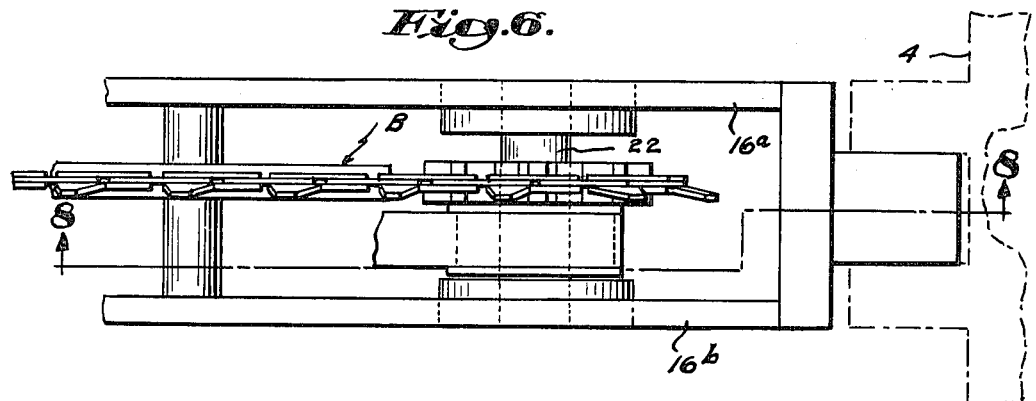
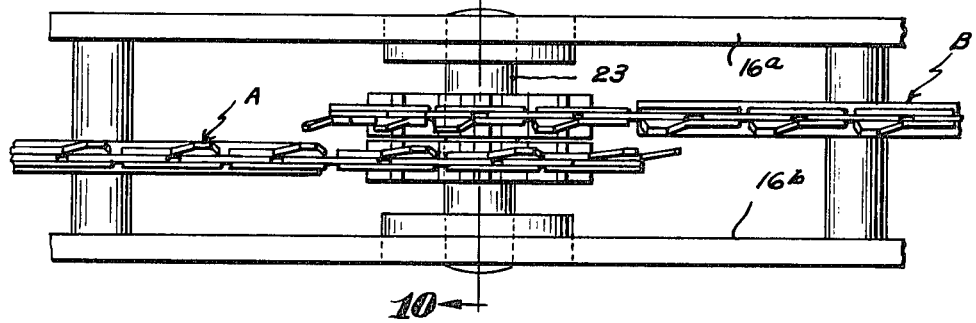
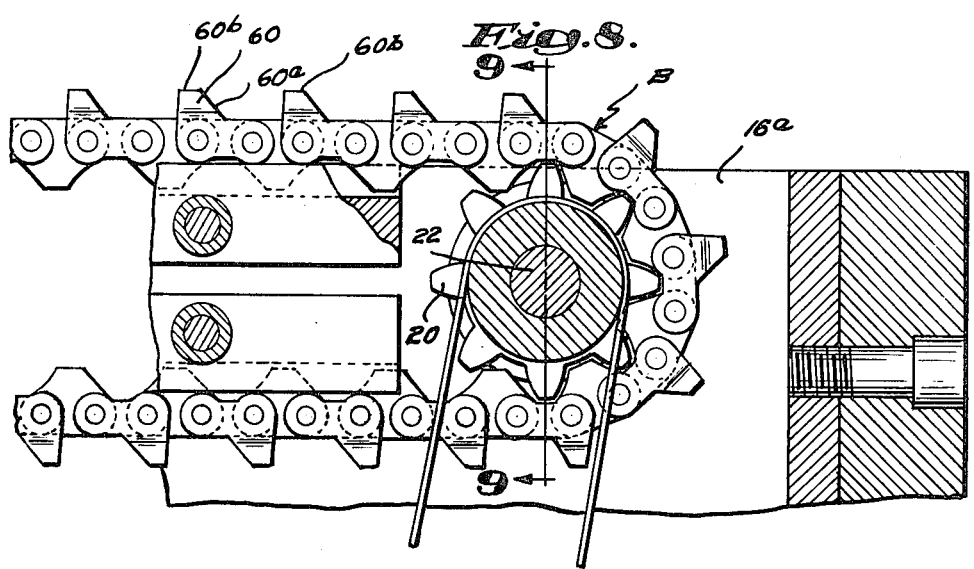

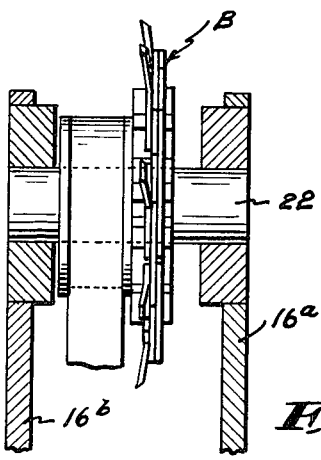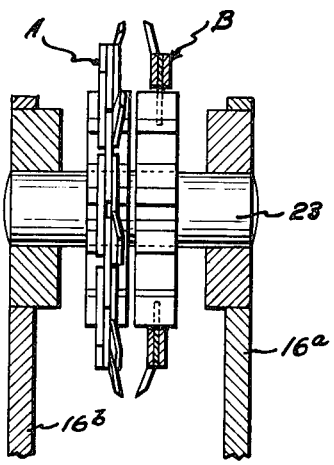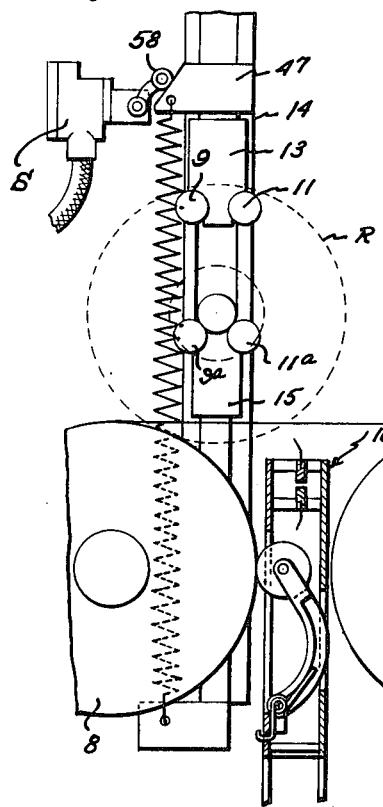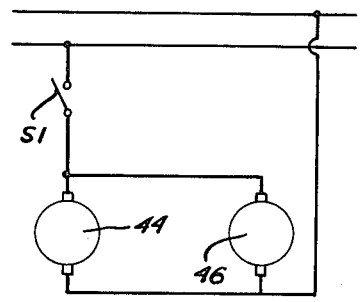

United States Patent Office 3,199,393
Patented Aug. 10, 1965

3,199,393
CHAIN CUTTER FOR WEB MATERIALS
Clifford W. Birch, Lexington, Mass., assignor to Birch Brothers, Inc., Somerville, Mass., a corporation of Massachusetts
Filed June 20, 1963, Ser. No. 289,234
6 Claims. (Cl. 83—563)

This invention relates to a method and apparatus for cutting textile webs and, more particularly, textile webs which are wound in web winding machines, for example, of the class disclosed in United States Patents 3,049,311 and 3,047,248 and others.

One typical operation is that of United States Patent No. 3,049,311 in which winding starts on a rear driving roll and is completed on a forward driving roll. In the first stage, with the machine at rest, a cylindrical shell is mounted in a jaw mechanism in a raised position with respect to the rear driving roll. An end of cloth is led into the machine and hand wrapped around the shell. The jaw mechanism is closed and the shell lowered into contact with the rear driving roll. Winding is then initiated and continues on this rear driving roll until a partly wound roll of cloth is obtained, with the jaw mechanism becoming raised as the diameter of the roll increases. At a given point the jaw mechanism is opened to release the shell and cloth roll. The partly wound roll is immediately transferred onto a forward driving roll, where a second stage of winding is continued until the required diameter is obtained. While the second stage of winding is thus taking place a new shell is inserted in the opened jaw mechanism. When the second stage of winding is completed, the jaws are closed and the new shell is lowered into contact with the rear driving roll. Means are then employed to cut the web and mechanically lap the cut end of material around the new shell. The completed roll, now separated from the web, is doffed and the cycle is repeated. The cutting means employed in the machine described in the patent, although satisfactory for cutting most types of cloth, is not entirely satisfactory in dealing with some textile webs, such as webs of unusual thickness or those which are produced with tough synthetic yarns.

A chief object of the invention, therefore, is to devise an improved method of cutting webs of material and, more especially, to devise a cutting mechanism for relatively thick resistant webs. It is further an object of the invention to provide a cutting mechanism which can be conveniently and cheaply combined with conventional cutting gate components of conventional web winding machines.

With these objectives in mind, I have devised an improved method of cutting a web of cloth in which a novel cutting action is carried out in two directions simultaneously whereby portions of the web are drawn away from one another and instant severing of relatively thick webs of cloth may be carried out in a highly efficient manner.

The nature of the invention and its other objects and novel features will be more fully understood and appreciated from the following description of a preferred embodiment of the invention shown in the accompanying drawings, in which:

FIGURE 1 is a plan view illustrating the cutting mechanism of the invention shown in association with side frame portions of a conventional web winding machine;

FIGURE 2 is a front elevational view of the structure shown in FIGURE 1;

FIGURE 2a is a detail view of a drive means for the cutting mechanism;

FIGURE 6 is an enlarged fragmentary plan view of a right hand end of the cutting mechanism as viewed in FIGURE 1;

FIGURE 7 is an enlarged fragmentary plan view of an intermediate portion of the cutting mechanism;

FIGURE 8 is a cross section taken on the line 8—8 of FIGURE 6;

FIGURE 9 is a cross section taken on the line 9—9 of FIGURE 8;

FIGURE 10 is a cross section taken on the line 10—10 of FIGURE 7;

FIGURE 11 is a detail elevational view showing the cutting mechanism and portions of an electro-mechanical device for controlling the rise and fall of the gate and cutting mechanism;

FIGURE 14 is a simple wiring diagram showing separate driving motors and control switch for the chain cutting apparatus.

The method of the invention is, in general, based on the novel concept of engaging a surface of a textile or other web material with two oppositely driven chain cutting elements which are arranged in such relationship to one another that the path of travel of one cutting member extends away from, and lies very nearly in the same plane with, the plane of travel of the other cutting member. As a result of this the cutters act in opposed relation while at the same time cooperating with one another to hold portions of cloth temporarily as the cut takes place.

The invention as hereinafter described is shown in one preferred form combined with portions of a textile web winding machine of the class noted above in United States Patent No. 3,049,311. However, it should be understood that the invention is not intended to be limited to this or any other specific form of web winding machine and may be employed in various ways where a different cutting operation is desired to be carried out along a sheet or web of material.

Figure 3:
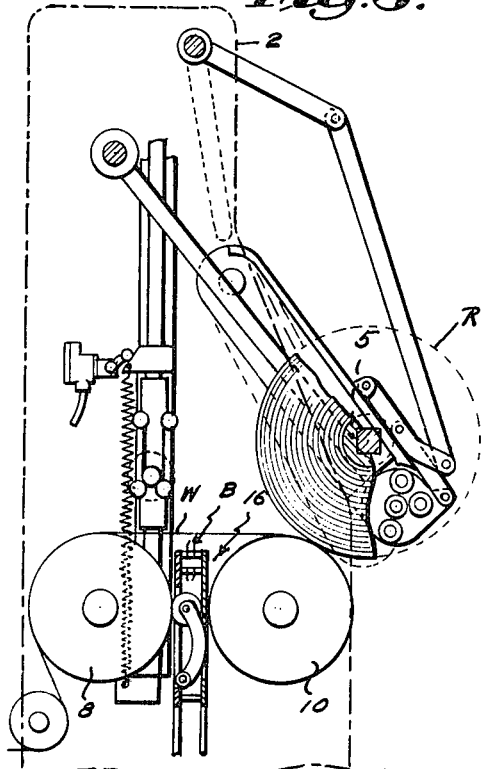
FIGURE 3 is an end elevational view illustrating portions of a web winding machine and further indicating the cutting mechanism of the invention associated therewith in a lowered position relative to a web of cloth being wound on the machine.
Figure 4:
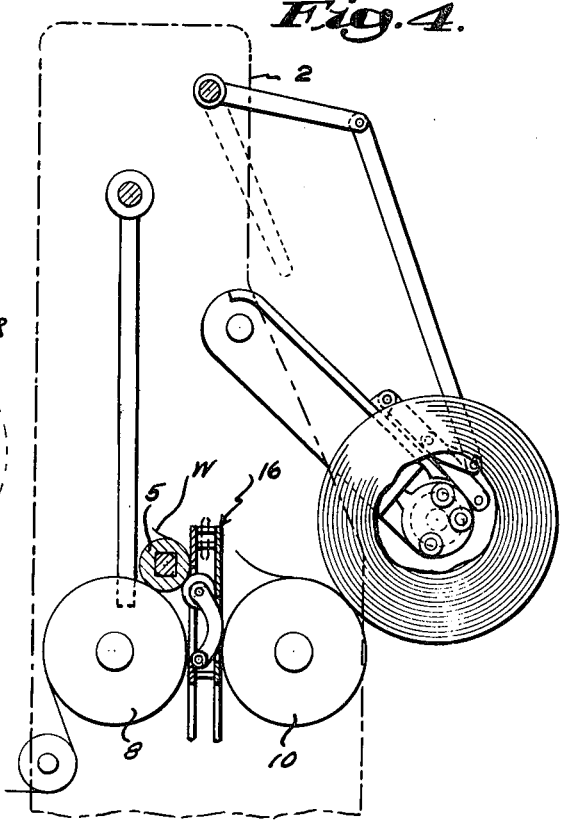
FIGURE 4 is a view similar to FIGURE 3, but showing the cutting mechanism in a raised position in which the web has just been cut.
Figure 5:
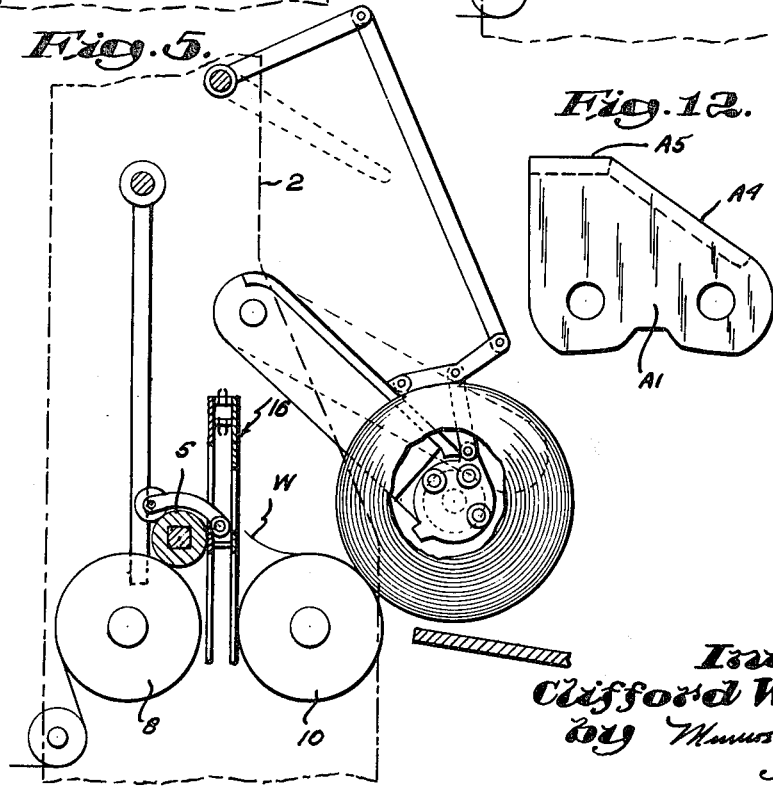
FIGURE 5 is also a view similar to FIGURES 3 and 4 and indicating the positon assumed by the cutting mechanism when in a fully raised state.

In the structure shown in the drawings, numerals 2 and 4 denote opposite side frame portions of a web winding machine of the type noted in United States Patent No. 3,049,311, and the side 2 of the machine is further indicated in broken lines in FIGURES 3, 4 and 5. Supported between the side frames 2 and 4 is a rear driving roll 8 and a forward driving roll 10. Also supported between the side frames for vertical movement above the rolls 8 and 10 is a winding shell 5 around which a web of cloth W may be wound.

As is customary in machines of this class, the ends of the shell 5 are received in vertically movable jaws 9, 11, 9a, 11a. These jaws are supported in slides as 13 and 15 in guide parts as 14, located on inner frame surfaces as has been suggested in FIGURE 11. As winding takes place with the shell 5 turning on the roll 8, a cloth roll R forms as suggested in dotted lines in FIGURE 11. At some intermediate winding point the shell 5, together with the partly wound roll R, is transferred into a position such as that shown in FIGURE 3 onto the forward driving roll 10. After winding in this position continues until a roll of desired size is formed, cutting of web W is carried out by causing a vertically reciprocable gate 16 to rise upwardly and to engage a cutting member against the underside of the web.

Figure 12:
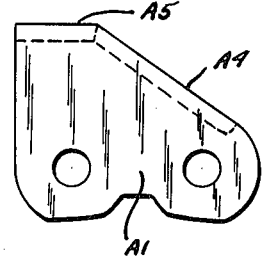
FIGURE 12 is a detail elevational view of an improved cutter element employed in the chain cutting apparatus of the invention.
Figure 13:
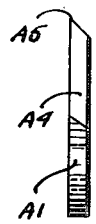
FIGURE 13 is another detail elevational view of the cutter element of FIGURE 12.

In accordance with the invention, I substitute for the conventional fixed cutter ordinarily mounted in the gate, a special chain cutting mechanism consisting of chain cutting members A, B which, as shown in FIGURES 1 and 2, consist of endless sprocket chains. The chains support around outer peripheral portions thereof cutting elements as A1 and A2, etc. on member A and cutting elements B1 and B2 on member B. As noted in FIGURE 1 the member B is mounted around an outer sprocket 20 and an inner sprocket 21, which sprockets are in turn supported on shaft members 22 and 23 located through the sides 16a and 16b of the gate 16. The cutting member A is supported around an outer sprocket 26 on shaft 25 and an inner sprocket 27 on the same shaft 23 with sprocket 21. FIGURES 12 and 13 illustrate in more detail the special form of cutter construction which I have devised for this cloth cutting operation. As shown therein I construct a cutting element A1 with a bevelled cutting edge which is of a gradually receding form. This edge is denoted by the numeral A4 and slopes rearwardly and upwardly as shown to merge with a top cutting edge A5 extending horizontally. I find that by combining a rearwardly sloping bevelled cutting edge with an upper horizontal cutting edge as described, I am enabled to carry out a rapid cutting action without pulling or drawing of cloth of a heavy nature. This is especially important at the time when cutting is initiated to insure that the cutters properly engage with the cloth in the same relative manner all along the line where cutting is to take place.

Also fixed on shafts 22 and 26 are sprockets 30 and 32 which carry sprocket chains 34 and 36 extending downwardly around respective sprockets 38 and 40 mounted on shafts as 42 of respective motors 44 and 46. The motor members are solidly secured to side portions of depending brackets 48 and 50 welded or otherwise secured to the gate 16 and are operated by closing a switch S1 in an independent circuit as shown in FIGURE 14. The latter member is adapted to be raised and lowered by means of a hydraulic actuating cylinder 52 centrally located in the base of the machine. A switch member S shown in FIGURE 11 controls movement of jaws 9, 11 when the roll reaches a predetermined diameter and causes a stop to trip the pivoted roller member 58. Further details of this electro-mechanical control apparatus are described in detail in Patent No. 3,049,311.

It will be apparent that by means of the structure described the driving motors will be raised as a part of the gate structure and thus the chain cutting members may be actuated while the gate is moving upwardly into contact with the web W with the switch S1 having been closed at an earlier point. The electrical supply line to the motors 44 and 46 may be conveniently connected into the line with the switch S, or may be separately controlled if desired. I may also desire to employ a form of cutting element such as that shown in FIGURE 12, as well as other forms of cutting elements.

I may, for example, employ a pair of separately driven cutting members in various other forms of supporting frames. For example, I may wish to utilize movable cutter frame portions in various types of machines where web cutting is desirable. Also, I may desire to utilize separately driven chain cutting members in a portable frame, or in a frame which may be disposed either horizontally, vertical, or angularly. In still other cases the dual chain cutting members may be arranged so that work is brought into contact with the cutters while they are held in one desired cutting position. Although I have described the invention especially with respect to cutting thick textile webs, it may also be desired to apply the invention to cutting other sheet materials, such as plastic, fibrous material, and the like.

While I have shown a preferred embodiment of the invention, it should be understood that various other changes and modifications may be employed in keeping with the scope of the appended claims.

I claim:

1. In a web winding machine of the class which includes a frame and a plurality of winding rolls received therein for supporting and winding a roll of cloth, the combination of a vertically reciprocating gate mounted between the sides of the frame, a pair of endless chain cutting means located in the gate for movement of travel in a horizontal plane in opposite directions, the inner ends of the chain cutting means being mounted about a common shaft transversely disposed between the intermediate portion of the cutter gate, the outer ends of the reciprocating chains being rotatably supported on two outer driven shafts transversely mounted through the opposite sides of the gate, said cutting means including spaced-apart cutting elements, and driving means supported on the underside of the gate for actuating said chain cutting means when the gate is in a raised position.

2. A structure according to claim 1 in which the gate includes driving motors rigidly fixed in the underside thereof and movable with the gate during vertical travel thereof.

3. A machine assembly including spaced side frame members, the combination of a vertically reciprocating gate extending between the side frame members and slidably mounted therebetween, a transversely extending shaft positioned at each end portion of said gate and extending transversely thereof, a third shaft extending transversely of the gate and parallel to the end shafts, said third shaft being positioned medially of the gate, means mounting said shafts on said gate, a sprocket wheel mounted on each of the end shafts and a pair of sprocket wheels mounted on the medial shaft, said sprocket wheels on the medial shaft being positioned in substantially abutting relation, a pair of endless sprocket chains, each of said sprocket chains being mounted on an end sprocket wheel and a medial sprocket wheel, spaced cutter elements fixed on the sprocket chains, and power means supported on the reciprocating gate having driving connections with the end sprocket wheels for rotating the same in opposite directions.

4. A structure according to claim 3 in which the spaced cutter elements fixed on the sprocket chains are provided with rearwardly and upwardly sloping cutting edges and the cutting edges on the pair of sprocket chains are oppositely facing.

5. A structure according to claim 3 in which the means supporting the power means comprises depending brackets which are mounted on the reciprocating gate and the power means comprise motors which are connected with the end sprocket wheels for driving the same.

6. A structure according to claim 3 in which a reciprocating motor is mounted beneath and medially of the vertically reciprocating gate to raise and lower the same to move the endless oppositely driven sprocket chain cutters into cutting position.

(References on following page)

References Cited by the Examiner

UNITED STATES PATENTS

| | | | |
|---|---|---|---|
| 12,327 | 1/55 | Russell | 143—32 |
| 485,888 | 11/92 | Schollenberger | 143—32 X |
| 601,608 | 3/98 | Levene | 143—32 |
| 624,704 | 5/99 | Tharandt | 143—32 X |
| 2,346,046 | 4/44 | Ogden | 143—32 X |
| 2,665,757 | 1/54 | Stevens et al. | |
| 2,715,941 | 8/55 | Rankin et al. | 83—614 X |
| 2,792,890 | 5/57 | Dyken | 83—614 X |
| 2,800,153 | 7/57 | Barth | 143—32 |
| 2,851,067 | 9/58 | Greenslate | 143—32 |
| 3,047,248 | 7/62 | Birch et al. | 242—56 |
| 3,049,311 | 8/62 | Birch | 242—56 |

WILLIAM W. DYER, JR., *Primary Examiner.*

ANDREW R. JUHASZ, *Examiner.*